United States Patent [19]

Okazaki

[11] Patent Number: 5,944,978
[45] Date of Patent: Aug. 31, 1999

[54] CLEANING METHOD OF AN ELECTROLYZED WATER FORMING APPARATUS AND AN ELECTROLYZED WATER FORMING APPARATUS HAVING MECHANISM FOR CONDUCTING THE METHOD

[75] Inventor: Yoshiya Okazaki, Kamifukuoka, Japan

[73] Assignee: Omco Co., Ltd., Saitama-Ken, Japan

[21] Appl. No.: 08/915,792

[22] Filed: Aug. 21, 1997

[51] Int. Cl.[6] ........................................................ C02F 1/461
[52] U.S. Cl. .............................. 205/701; 205/746; 205/747; 205/751; 205/263; 205/264; 204/263; 204/264
[58] Field of Search ................................... 205/701, 742, 205/746, 747, 751; 204/263, 264

[56] References Cited

U.S. PATENT DOCUMENTS

| | | | |
|---|---|---|---|
| 5,510,009 | 4/1996 | Arai et al. ................................ | 205/746 |
| 5,720,869 | 2/1998 | Yamanaka et al. ...................... | 205/701 |

*Primary Examiner*—Arun S. Phasge
*Attorney, Agent, or Firm*—Armstrong, Westerman, Hattori, McLeland & Naughton

[57] ABSTRACT

Chlorine ion-containing water supplied from one of water discharge pipelines of an electrolysis vessel of an apparatus for continuously forming electrolyzed water is caused to flow backwardly to one of electrode chambers and a water supply branch pipe thereof, passed through a water supply branch pipe of the other of the electrode chambers and/or a water supply pipeline at the upstream thereof and discharged through the other of the electrode chambers and from the other of the water discharge pipe lines. In this state, water in the electrolysis vessel is electrolyzed while operating the electrode of the electrode chamber in which water is caused to flow backwardly as an anode, and the electrolysis vessel and water channels at the upstream thereof are cleaned and sterilized by electrolyzed cleaning water in which hypochlorous acid is formed.

Alternatively, water may be electrolyzed while supplying from a pair of water discharge pipelines backwardly into the electrolysis vessel, and electrolyzed cleaning water formed in the electrolysis vessel may be caused to flow backwardly and discharged from the water supply pipeline.

8 Claims, 6 Drawing Sheets

CLEANING METHOD OF AN ELECTROLYZED WATER FORMING APPARATUS AND AN ELECTROLYZED WATER FORMING APPARATUS HAVING MECHANISM FOR CONDUCTING THE METHOD

BACKGROUND OF THE INVENTION

1. Field of the Invention

The present invention concerns a method of cleaning and sterilizing an apparatus for continuously forming electrolyzed water, as well as an apparatus for continuously forming electrolyzed water having a mechanism for conducting the method described above.

2. Related Art Statement

An apparatus for forming a electrolyzed water by continuously passing water such as tap water and preparing the same into alkaline water and acidic water, optionally, with addition of a solution of chemicals such as minerals has to be cleaned for electrolysis vessels and water channels after long time use. For instance, since precipitates such as of calcium are deposited in a cathode chamber or on an electrolysis diaphragm of the electrolysis vessel to lower the electrolyzing efficiency, there precipitates be removed. Further, since a water purifier using activated carbon is generally disposed in a water supply pipe line of the raw water, residual chlorine in the water is removed and miscellaneous bacteria tend to be generated in the water channels or microfilters downstream of the filter, so that cleaning and sterilization are necessary either periodically or occasionally.

For cleaning for electrolyzed water forming apparatus of this type, a method of applying cleaning under electrolysis while switching the polarity of the electrode of the electrolysis vessel upon cleaning has been known. In this cleaning method, acidic water is passed to the channel for alkaline water in the usual formation of electrolyzed water, this audio water being capable of dissolving calcium and sterilizing bacteria.

However, since the electrolyzed water formed under inverted polarity upon cleaning passes only the electrolysis vessel and the water discharging pipeline downstream thereof in this method, it has a drawback that a water supply channel upstream of the electrolysis vessel and a filtration water purifier such as a microfilter interposed in the water supply channel cannot be cleaned.

OBJECT OF THE INVENTION

It is a first object of the present invention to provide a method of cleaning and sterilizing an electrolysis vessel, as well as a water circuit including a water supply pipeline upstream thereof and a filtration water purifier such as a microfilter interposed in the water supply pipeline, with sterilizing water in which hypochlorous acid is formed.

A second object of the present invention is to provide an apparatus for continuously forming electrolyzed water having a mechanism for practicing the cleaning method described above.

SUMMARY OF THE INVENTION

The foregoing object of the present invention can be attained by forming a cleaning water circuit of backwardly flowing raw water supplied from a water discharge pipeline of one electrode chamber of an electrolysis vessel to the electrode chamber and a water supply branch pipe of the electrode chamber, then passing the water to a water supply pipeline or a water supply branch pipe of the other electrode chamber, and discharging the same through the other electrode chamber from a water discharge pipeline of the other electrode chamber, and conducting electrolysis by operating the electrode chamber in which the water is caused to flow backwardly as an anode.

The foregoing object of the present invention can also be attained by backwardly flowing raw water supplied from a water discharge pipeline of an electrolysis vessel through the electrolysis vessel and a water supply pipeline of the electrolysis vessel and discharging the same from the water supply pipeline while electrolyzing water in the electrolysis vessel.

DESCRIPTION OF THE ACCOMPANYING DRAWINGS

FIG. 1b is a cleaning water circuit diagram in the electrolyzed water forming apparatus shown in FIG. 1a;

FIG. 2b is a cleaning water circuit diagram in the electrolyzed water forming apparatus shown in FIG. 2a;

FIG. 3bis a cleaning water circuit diagram in the electrolyzed water forming apparatus shown in FIG. 3a.

DESCRIPTION OF THE PREFERRED EMBODIMENTS

Descriptions will be made specifically to a method of cleaning an apparatus for an electrolyzed water forming apparatus according to the present invention and an apparatus for forming electrolyzed water having a mechanism for practicing the method by way of preferred embodiments with reference to the accompanying drawings.

A continuous type electrolyzed water forming apparatus 1 shown in FIG. 1a to FIG. 2b comprises a pair of electrodes 2, 3 (cathode 2 and anode 3 in FIG. 1), an electrolysis diaphragm 4 for partitioning a space between the electrodes into a pair of electrode chambers 5, 6 (cathode chamber 5 and anode chamber 6), to constitute an electrolysis vessel 7 having a diaphragm. A water supply pipeline 8 is connected to the water supply side of the electrolysis vessel 7, while a pair of discharge pipelines 9, 10 in communication with the electrode chambers 5, 6, respectively, are connected to the water discharge side of the electrolysis vessel.

The water supply pipeline 8 is bifurcated into two water supply branch pipes 11, 12 in which one water supply branch pipe 11 is connected to the electrode chamber (cathode chamber 5) of the electrolysis vessel 7, while the other water supply branch pipe 12 is connected to the other electrode chamber (anode chamber 6), respectively.

In the electrolyzed water forming apparatus 1, a filtration water purifier 13 comprising, for example, a microfilter is interposed in the water supply pipeline 8 and the pipeline is bifurcated downstream of a common water discharge portion 14 of the filtration purifier 13 into the two water supply branch pipes 11, 12. Accordingly, a pair of water supply branch pipes 11, 12 are in communication to each other in the common water discharge portion 14 of the filtration purifier 13.

In the drawings are also shown a mineral addition cylinder 15 for supplementing calcium or the like to the water passing through the water supply pipeline 11 on the side of the cathode chamber and a flow switch 16 is used, for example, for the ON-OFF control of the electrolysis vessel 7 depending on the detection of the flow of water in the water supply pipeline.

Figure 1A:
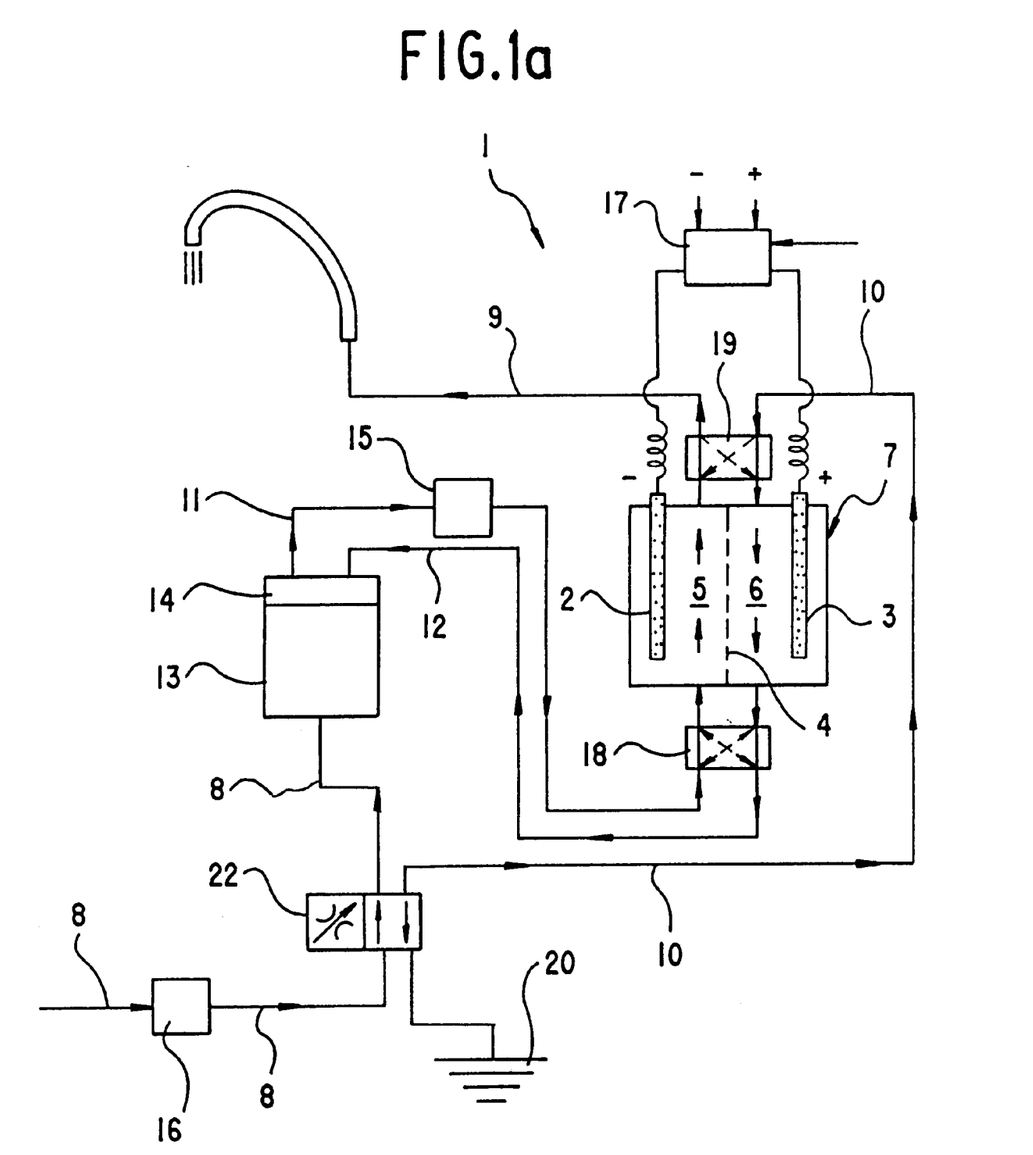
FIG. 1a is a schematic view of an electrolyzed water forming apparatus of one embodiment according to the present invention.
Figure 1B:
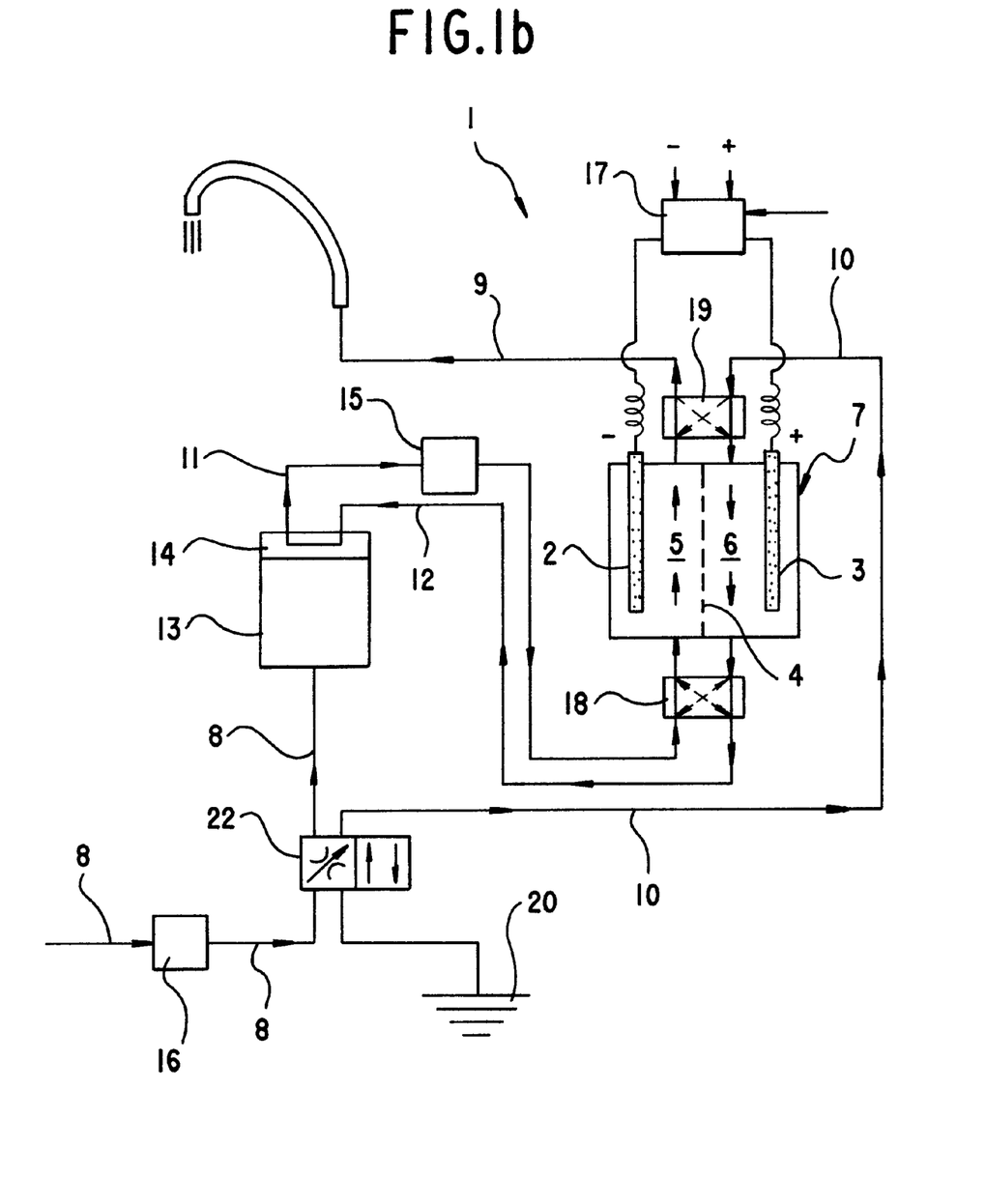

In the electrolyzed water forming apparatus 1, the electrodes 2, 3 are made of a material which can be used both for the cathode and the anode, and the polarity for the electrodes 2, 3 can be switched to each other by an electric control device 17, for example, as shown in FIG. 1a and FIG. 1b. Further, a flow channel switching device 18 is interposed between the pair of water supply branch pipes 11, 12, while a flow channel switching device 19 is interposed between the pair of water discharge pipelines 9, 10, respectively. With devices 18 and 19, water passing through the mineral supply cylinder 15 is always supplied to the cathode chamber, while alkaline water in the cathode chamber is always discharged from the alkaline water discharge pipeline 9 even when the polarity of the electrodes is switched. In the electrolyzed water forming apparatus of this type, since the polarities of the electrode chambers are changed by the operation of the electric control device 17 for polarity switching, the electrode chambers 5, 6, the water discharge pipelines 9, 10 and the water supply branch pipes 11, 12 are turned on the cathode side or the anode side depending on the operation of the electric control device 17, the flow channel switching device 19 on the water discharging side and the flow channel switching device 18 on the water supplying side.

In the continuous type electrolyzed water forming apparatus 1, water such as tap water supplied from the water supply pipeline 8 by way of water supply branch pipes 11, 12 is electrolyzed in the electrolysis vessel 7. Electrolyzed alkaline water formed in the cathode chamber 5 is discharged from the alkaline water discharge pipeline 9, while electrolyzed acidic water formed in the anode chamber 6 is discharged from the discharge pipeline 10 to a drain 20, in usual operation for forming electrolyzed water.

Figure 2A:
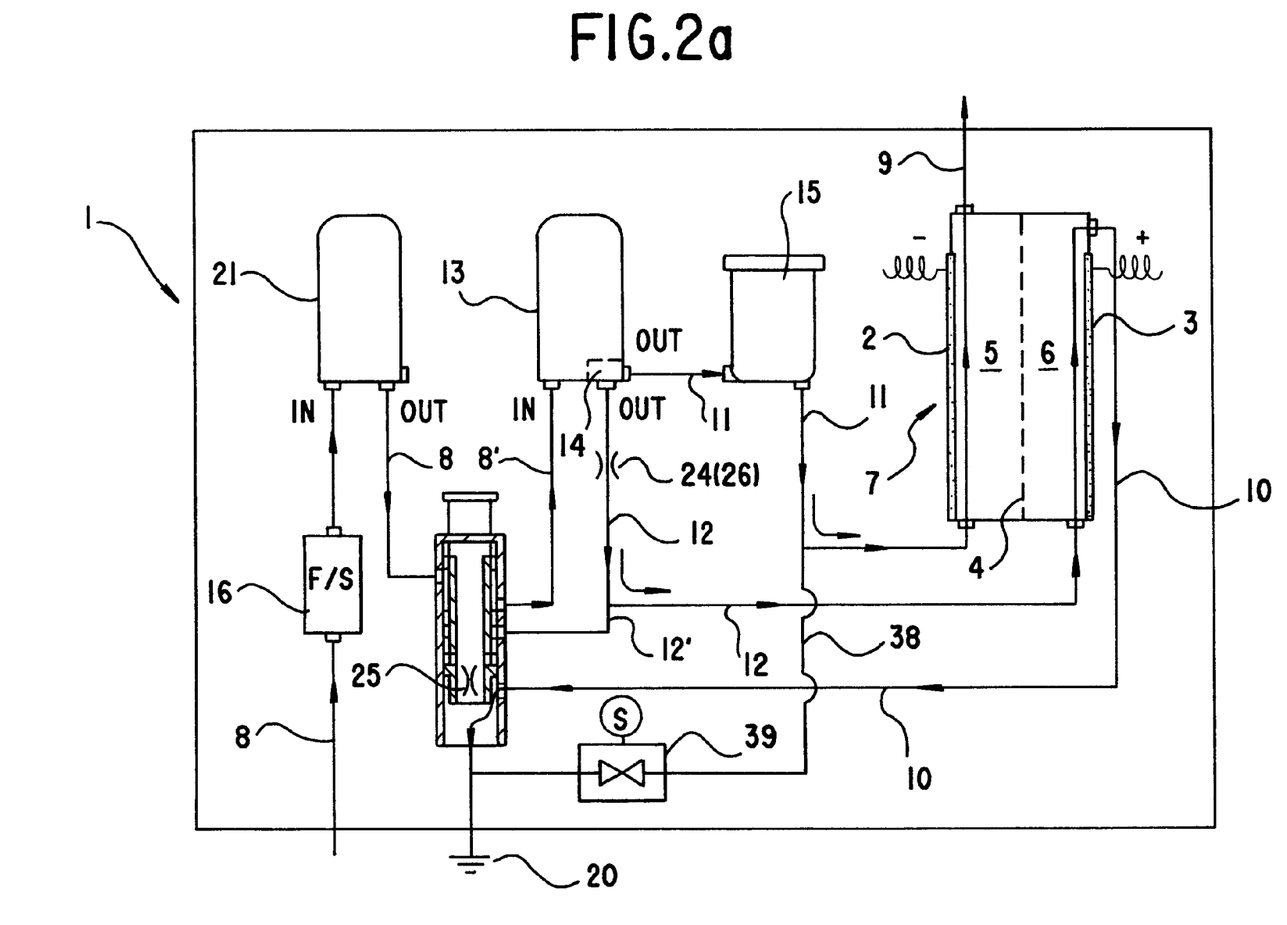
FIG. 2a is a schematic view of an electrolyzed water forming apparatus of another embodiment according to the present invention.

As shown in FIG. 2a, an adsorption water purifier 21 using activated carbon or the like may be interposed in the water supply pipeline 8 upstream of the filtration purifier 13.

Upon cleaning such a continuous type electrolyzed water forming apparatus, the cleaning method according to the present invention comprises supplying water such as tap water containing chlorine ions, which is supplied from a water supply pipeline from an exit of one of electrode chambers by way of one of water discharge pipelines, passing supplied water, which is caused to flow backwardly through the electrode chamber and the water supply branch pipe of the electrode chamber, to the water supply branch pipe of the other electrode chamber, to the water supply pipeline upstream thereof or to both of the water supply pipeline and the water supply branch pipe of the electrode chamber, then discharging the same through the other electrode chamber from the other water discharge pipeline, and electrolyzing water passing through the electrolysis vessel such that the electrode chamber in which water is caused to flow backwardly operates as an anode chamber.

Further, for the apparatus in which the filtration water purifier 13 is disposed to the water supply pipeline 8 as shown in the drawing, the cleaning method according to the present invention passes electrolyzed water formed in the anode chamber of the electrolysis vessel to the common water discharge portion 14 of the filtration purifier 13, to the water supply pipeline 8 upstream of the filtration water purifier 13 or to both of the water supply pipeline 8 and the common water discharge portion 14.

Further, the method of controlling such that the electrolysis chamber in which the water is caused to flow backwardly operates as the anode chamber includes a method of controlling the polarity of the electrode to the anode by the electric control device 17 and a method of control by using the flow channel switching device 19 for the water discharge pipelines 10, 9.

According to this method, when water containing chlorine ions such as tap water is supplied from the water supply pipeline 8 by way of the water discharge pipeline 10 to the anode chamber 6 and electrolyzed, hypochlorous acid is formed in electrolyzed water in the anode chamber 6 to form aqueous hypochlorous acid of strong sterilizing power. The electrolyzed water is caused to flow backwardly through the anode chamber 6 and one water supply branch pipe 12, sent to the common water discharge portion 14 of the filtration water purifier 13, to the water supply pipeline 8 upstream of the filtration water purifier 13 or to both of the water supply pipeline 8 and the common water discharge portion 14, caused to flow to the other water supply branch pipe 11 and discharged by way of the cathode chamber 5 of the electrolysis vessel from the other water discharge pipeline 9. By this method, the electrolysis vessel, as well as the entire water circuit including the water supply pipeline 8 and the filtration water purifier 13 interposed therein, are cleaned and sterilized by aqueous hypochlorous acid having high sterilizing power.

The drawing shows an example of backwardly flowing water in the water supply pipeline 8 by way of the acidic water discharge pipeline 10 to the anode 6. The method of operating the electrode chamber in which the water is caused to flow backwardly includes various modes depending on the operation of the electric control device 17 and/or the flow channel switching device 19 for the pair of water discharge pipelines 9, 10 as below.

(1) A mode of conducting cleaning under electrolysis by switching the polarities of the electrodes while backwardly flowing water supplied from the acidic water discharge pipeline 10 to the cathode chamber 5 by the flow channel switching device 19.

(2) A mode of conducting cleaning under electrolysis by switching the polarities of the electrode while backwardly flowing water supplied from the alkaline water discharge pipeline 9 to the cathode chamber 5.

(3) A mode of conducting cleaning under electrolysis by switching the polarities of the electrodes while backwardly flowing water supplied from the alkaline water discharge pipeline 9 to the anode chamber 6 by the flow channel switching device 19.

The drawing shows a continuous type electrolyzed water forming apparatus having a mechanism for practicing the cleaning method described above. The apparatus shown in FIG. 1a and FIG. 1b has a flow channel switching device 22 for cleaning disposed between the water supply pipeline 8 and water discharge pipeline 10 on the side of the anode chamber for switching water from the water supply pipeline 8 to the water discharge pipeline 10 on the side of the anode chamber.

This embodiment is adapted for switching water supplied from the water supply pipeline 8 to one water discharge pipeline 10 by the flow channel switching mechanism 22 for cleaning, supplying the water by way of the water discharging pipeline 10 from the exit of one electrode chamber 6, sending electrolyzed cleaning water flowing backwardly through the electrode chamber 6 and the water supply branch pipe 12 of the electrode chamber 6 to the common water discharge portion 14 of the filtration water purifier 13 interposed to the water supply pipeline 8, passing the water to the water supply branch pipe 11 of the other electrode chamber 5 and then discharging the same through the other electrode chamber 5 from the other water discharge pipeline 9.

Although not illustrated in the drawing, the present invention also includes such an embodiment of interposing the flow channel switching mechanism 22 for cleaning between the water supply pipeline 8 and the water discharge pipeline 9, such that water supplied from the water discharge pipeline 9 is caused to flow to the water supply port of the anode chamber by the switching of the electrode polarity or the switching of the flow channel from the water discharge pipeline 9 to the water discharge pipeline 10.

As shown in FIG. 1b, in the case of disposing the filtration purifier 13 to the water supply pipeline 8, and passing electrolyzed water formed in the anode chamber 6 upon cleaning from the water supply branch pipe 12 of the anode chamber 6 by way of the common water discharge portion 14 of the filtration water purifier 13 to the water supply branch pipe 11 of the cathode, a cleaning water circuit can be constituted by merely disposing the flow channel switching mechanism 22 for cleaning between the water supply pipeline 8 and one water discharge pipeline 10.

Figure 2B:
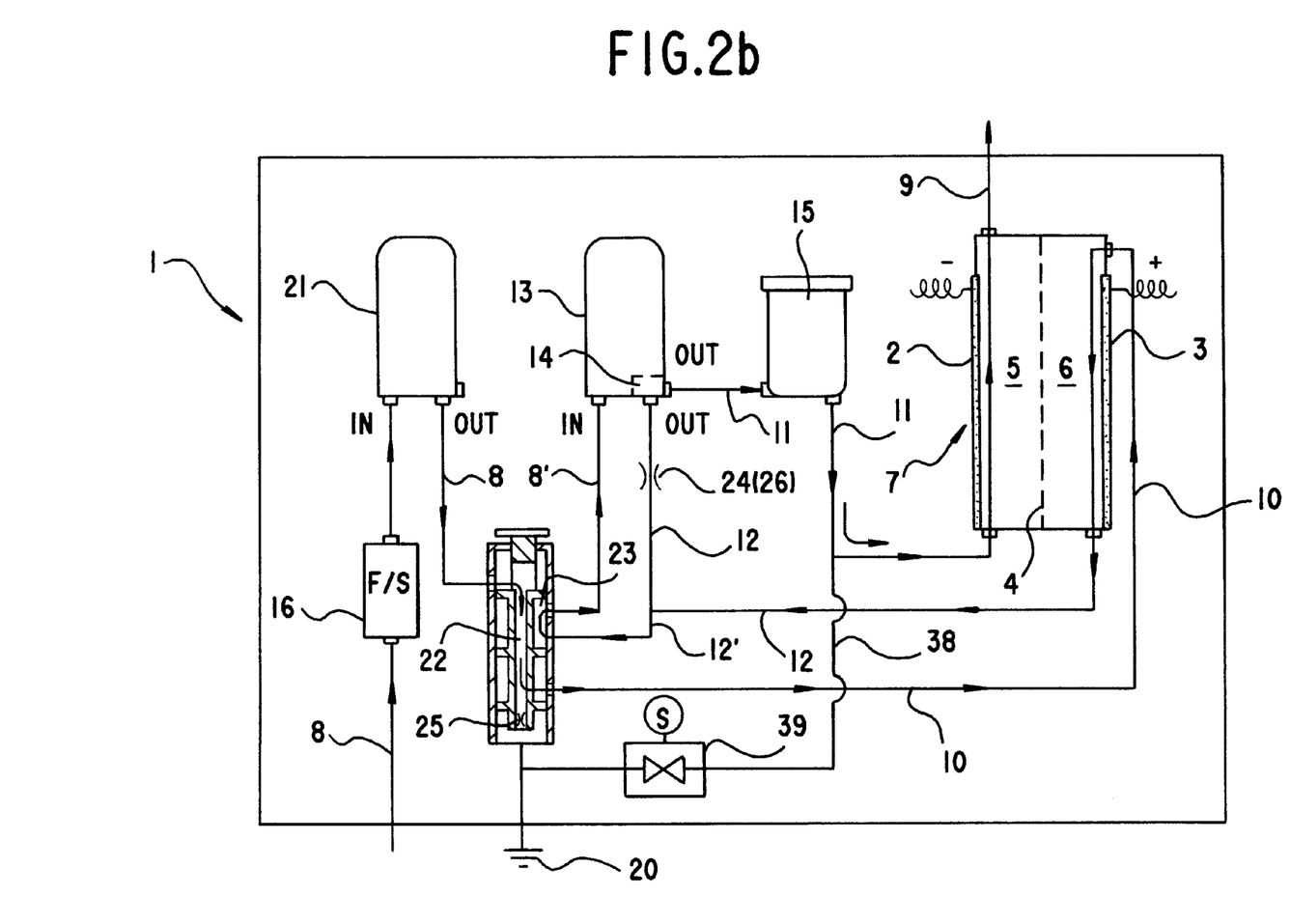

On the other hand, in a case of passing the electrolyzed water formed in the anode chamber during cleaning from the water supply port of the filtration water purifier 13 to the water discharge portion thereby cleaning the entire internal channel of the filtration water purifier 13, the constitution as shown in FIG. 2a and FIG. 2b is necessary.

FIG. 2a and FIG. 2b show another embodiment of an apparatus in which electrolyzed cleaning water is passed from the water supply port of the filtration water purifier 13 disposed in the water supply pipeline 8 to actively clean the this case, a first flow channel switching device 22 for cleaning is disposed between the water supply pipeline 8 and one water discharge pipeline 10 for switching water of the water supply channel 8 to one water discharge pipeline 10 and, further, a second flow channel switching mechanism 23 for cleaning is disposed between the water supply branch pipe 12 in communication with one water discharge pipeline 10 and a water supply pipeline 8' downstream of the first flow channel switching mechanism 22 for cleaning for connecting the water supply branch pipe 12 and the water supply pipeline 8'. In this case, the water supply branch pipe 12 may be connected directly to the water supply pipeline 8' or, alternatively, may be connected by way of a branched pipe 12' branched from the water supply branch pipe 12 to the water supply pipeline 8' as shown in FIG. 2b.

In a case of connecting the water supply branch pipe 12 directly to the upstream water supply pipeline 8 upstream of the filtration water purifier 13, electrolyzed cleaning water of the water supply branch 12 flows only to the water supply pipeline 8' upstream of the filtration water purifying 13.

On the other hand, in the structure connecting by way of the branch pipe 12' from the water supply branch pipe 12 with the water supply pipeline 8', since the water supply branch pipe 12 is designed to be in communication with the common water discharge portion 14 of the filtration water purifier 13, electrolyzed cleaning water flows to both of the water supply pipeline 8' upstream of the filtration water purifier 13 and the common water discharge portion 14 of the filtration water purifier 13.

In this case, in order to flow the electrolyzed cleaning water of the water supply branch pipe 12 preferentially to the water supply pipeline 8' upstream of the filtration water purifier, it is desirable to dispose a flow rate control device 24 such as a restriction valve to the water supply branch pipe 12 between the bifurcation of the branched pipe 12' and the common water discharge portion 14 of the filtration water purifier 13.

In a case where a restriction 26 is disposed to the water supply pipeline 12 on the side of the anode for setting a predetermined flow rate ratio between the pair of water supply branch pipelines 11 and 12, the restriction 26 functions as the flow rate control device 24.

The second cleaning flow channel switching mechanism 23 for cleaning is not restricted only to the switching valve shown in the figure. For example, although not illustrated, it may be constituted by a water passing channel with a check valve connected from the water supply branch pipe 12 to the water supply pipeline 8.

Further, the first flow channel switching mechanism 12 for flowing and the second flow channel switching mechanism 23 for flowing may be disposed independently of each other. However, it is desirable that the two flow channel switching mechanisms 22, 23 are incorporated in one single valve casing and interlocked with each other as shown in FIG. 2b.

By the way, as shown in drawing, when water supplied from one water discharge pipeline 10 is caused to flow backwardly through the electrode chamber 6 and the water supply branch pipe 12 thereof, and passed to the filtration water purifier 13, the pressure of water in the electrode chamber 6 is increased relatively due to the resistance in the filtration water purifier 13 to, which may cause a threat of breaking the electrolysis diaphragm 4. For eliminating this problem, it is desirable to dispose a pressure reducing device on the side of the water discharge pipeline 10 (cleaning water supply channel) and/or water supply branch pipe (cleaning water discharge channel) 12 of the electrode chamber 6 in which water is caused to flow backwardly. The pressure reducing device 25 on the side of the water discharge pipeline 10 has a structure of providing a resistance such as a restriction valve to the branched water passing channel in communication with the water discharge pipeline 10, by which water discharged from the pressure reduction device 25 flows to the drain 20.

Further, a pressure reduction device 26 on the side of the water supply pipeline 12 has a structure providing a resistance such as a restriction valve to a water passing channel in communication with the water supply branch pipe 12. In a case of disposing the flow control device 24 to the water supply branch pipe 12 between the bifurcation of the branch sub-pipe 12' of the water supply branch pipe 12 and the common water discharge portion 14 of the filtration water purifier 13 as shown in the figure, the water supply branch pipe 12 having the flow rate control device 24 interposed therein can be utilized as the pressure reduction device 26 on the side of the water supply branch pipe.

In FIG. 2a and FIG. 2b, a pipeline depicted by a reference numeral 38 is a water drain pipeline opened/closed by an open/close valve 39.

Figure 3A:
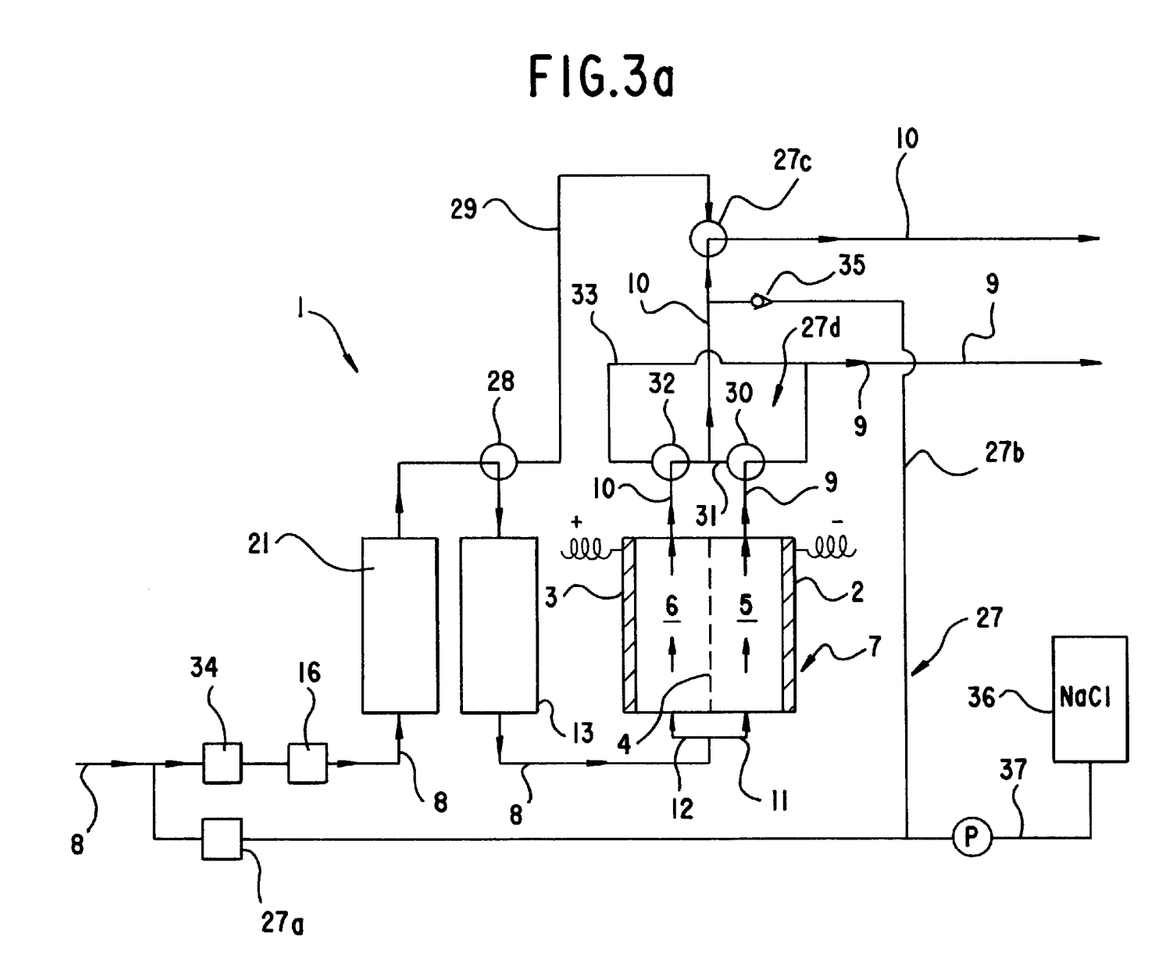
FIG. 3a is a schematic view of an electrolyzed water forming apparatus of a further embodiment according to the present invention.
Figure 3B:
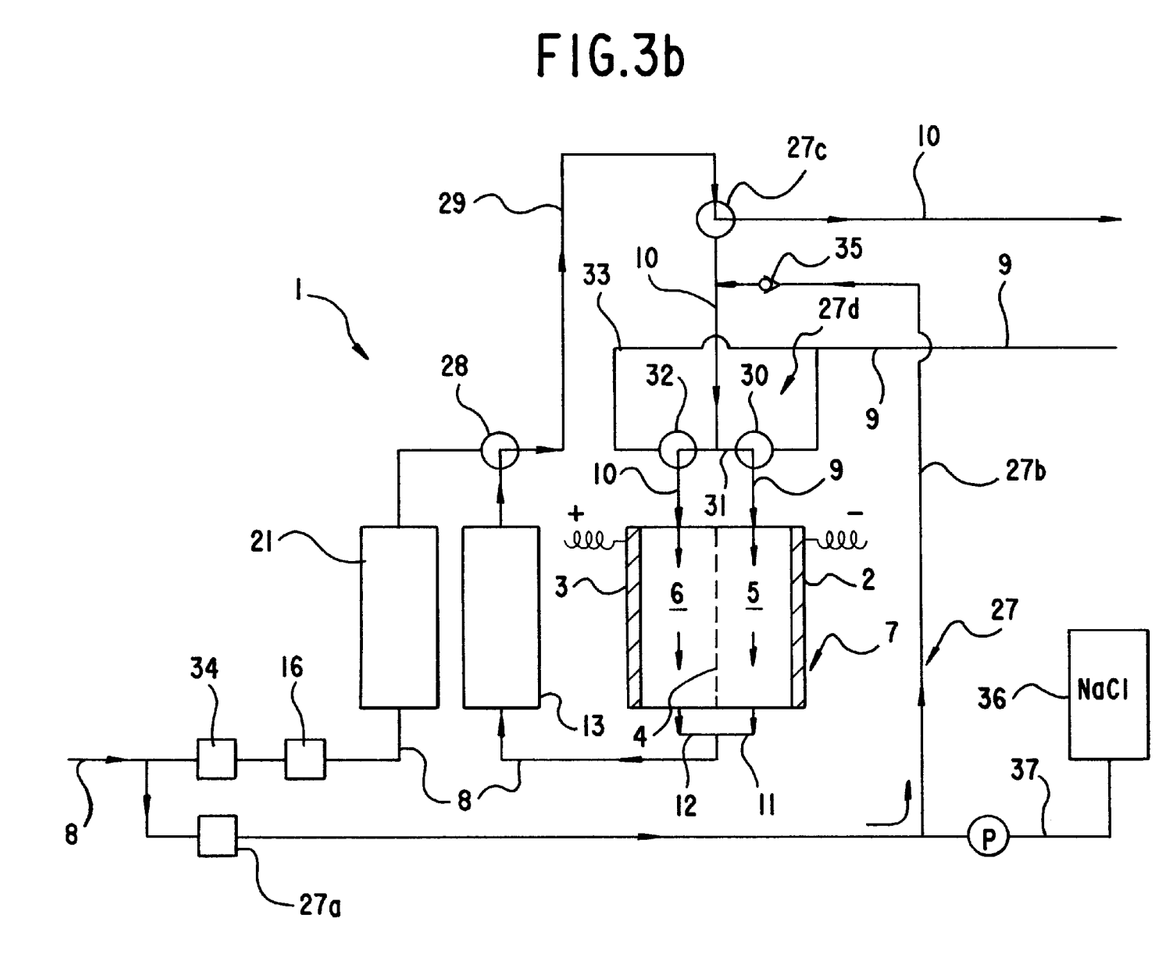

FIG. 3a and FIG. 3b show another cleaning method according to the present invention and a continuous type electrolyzed water forming apparatus having a mechanism for practicing the method. This is a cleaning method for an continuous type electrolyzed water forming apparatus of electrolyzing water such as tap water supplied continuously from the water supply pipeline 8 in an electrolysis vessel 7 having a diaphragm or an electrolysis vessel 7 not having a diaphragm, into alkaline water and acidic water and then discharging them from a pair of water discharge pipelines respectively, wherein water from the water supply pipeline 8 is supplied from a pair of water discharge pipelines 9, 10 of the electrolysis vessel 7, and caused to flow backwardly through the entire region of the electrolysis vessel 7 for electrolysis, and the resultant electrolyzed cleaning water is caused to flow backwardly to the water supply pipeline 8 and then discharged from the water supply pipeline 8.

FIG. 3a and FIG. 3b show an example of an electrolyzed water forming apparatus using an electrolysis vessel 7 having a diaphragm. Since the cleaning method flows cleaning water from the water supply pipeline 8 backwardly through the entire region of the channel of the electrolysis vessel, it is applicable not only to the apparatus of using the electrolysis vessel having the diaphragm as shown in the drawing but also to an electrolyzed water preparing apparatus of forming alkaline water and acidic water in an electrolysis vessel not using an electrolysis diaphragm 4 and discharging the same through a pair of water discharge pipelines 9, 10.

Thus, according to the cleaning method, by backwardly flowing and electrolyzing water containing chlorine ions such as tap water through the electrolysis vessel 7, hypochlorous acid is formed in electrolyzed water in the electrolysis vessel 7 to form water of strong sterilization power. Since the sterilized water is caused to flow backwardly through the electrolysis vessel 7 and the water supply pipeline 8, passed preferably through the filtration water purifier 13 and discharged from the water supply pipeline 8 at the upstream, the electrolysis vessel 7 and the water channel at the upstream thereof are cleaned with sterilizing water.

For forming a great amount of hypochlorous acid in the electrolyzed water in the electrolysis vessel 7, a chloride salt such as sodium chloride may be added to water supplied from the water discharge pipeline 10 to the electrolysis vessel 7.

For enabling the practice the cleaning method described above, the electrolyzed water forming apparatus 1 shown in FIG. 3a and FIG. 3b comprises a flow channel switching mechanism 27 for cleaning which switches water supplied from the water supply pipeline 8 to a pair of water discharge pipelines 9, 10 of the electrolysis vessel 7, and backwardly flow the same from the discharge side to the entire area of the electrolysis vessel 7, and a branched water discharge channel 29 branched from the water supply pipeline 8 by way of a switching valve 28.

The flow channel switching mechanism 27 for cleaning in the embodiment shown in FIG. 3a comprises a cleaning water supply pipeline 27b connected from the water supply pipeline 8 by way of a switching valve 27a to one water discharge pipeline 10, a back flow control valve 27c disposed in the water discharge pipeline 10 downstream of the junction point with the cleaning water supply pipeline 27b and functions so as to backwardly flow the cleaning supply water supplied to the water discharge pipeline 10 to the electrolysis vessel 7, and a distribution circuit 27d for distributing the cleaning supply water supplied to the water discharge pipeline 10 to the other water supply pipeline 9. In the embodiment shown in FIG. 3a, the distribution circuit 27d comprises a switching channel 31 connected from the water discharge pipeline 9 by way of a switching valve 30 to the water discharge pipeline 10.

Further, in the electrolyzed water forming apparatus shown in FIG. 3a, a switching channel 33 is connected from the water discharge pipeline 10 to the water discharge pipeline 9 by way of a switching valve 32, and the switching channels 31, 33 and the switching valves 30, 32 constitute a switching mechanism for the water discharge pipelines 9, 10.

The switching valve 27a of the embodiment shown in the drawing is a ON-OFF valve disposed to the cleaning water supplying pipeline 27b, and water supplied from the water supply pipeline 8 is selectively supplied to the water supply side of the electrolysis vessel 7 and the cleaning water supply pipeline 27 by selectively opening an ON-OFF valve 34 disposed in the water supply pipeline 8 downstream of the bifurcation of the cleaning water supply pipeline 27b and the switching valve 27a.

A check valve 35 is preferably disposed to the cleaning water supply pipeline 27b, and a branched water discharge channel 29 of the water supply pipeline 8 is desirably in communication by way of the back flow control valve 27c to the water discharge pipeline 10.

Although not illustrated in the drawing, the cleaning water supply pipeline 27b may be bifurcated and connected directly to the pair of water discharge pipelines 9, 10 of the electrolysis vessel 7. In this case, water supplied from the cleaning water supply pipeline 27b can be caused to flow backwardly from the pair of water discharge pipelines 9, 10 to the electrolysis vessel 7 by disposing the back flow control valve 27c to each of the water discharge pipelines 9, 10.

Further, as shown in FIG. 3a, a pipeline 37 may be connected from a tank 36 for an aqueous solution of chloride salt such as sodium chloride to the cleaning water supply pipeline 27b and, optionally, an aqueous solution of sodium chloride may be added to water in the cleaning water supply pipeline 27b, so that a great amount of hypochlorous acid (HClO) may be formed in an electrolyzed cleaning water in the electrolysis vessel 7. Thus, as shown in FIG. 3b, when water of the water supply pipeline 8 is switched to the cleaning water supply pipeline 27b, the switching valve 28 of the water supply pipeline 8 is opened to the branched water discharge line 29 and electrolysis is conducted while flowing water from the water supply pipeline 8 backwardly to the electrolysis vessel 7 and sterilized water containing hypochlorous acid is formed in the electrolysis vessel 7. In the course of discharging sterilized water through the electrolysis vessel 7, the water supply pipeline 8, and the filtration water purifier 13 from the branched water discharge channel 29 of the water supply pipeline 8, such water circuits, are cleaned and sterilized.

In the embodiment shown in FIG. 3a, the water supply pipeline 8 is bifurcated into water supply branch pipes 11, 12 near the electrolysis vessel 7, but it may be bifurcated into a pair of water supply branch pipes 11, 12 from the common water discharge portion 14 of the filtration water purifier 13 as shown in FIG. 1a.

What is claimed is:

1. A method of cleaning an apparatus for continuously forming electrolyzed water by electrolyzing water supplied from a water supply pipeline by way of bifurcate water supply branch pipes to the water supply side of a cathode chamber and an anode chamber of an electrolysis vessel having a diaphragm and discharging alkaline water formed in the cathode chamber and acidic water formed in the anode chamber from a pair of water discharge pipelines respectively, wherein the method comprises supplying water supplied from a water supply pipeline by way of one of water discharging pipelines from an exit of one of the electrode chambers continuously or intermittently, passing supplied water which is caused to flow backwardly through the electrode chamber and a water supply branch pipe of the electrode chamber to a water supply branch pipe of the other of the electrode chambers, to the water supply pipeline thereof or to both of the water supply pipeline and the water supply branch pipe of the other of the electrode chambers and then discharging the thus passed water through the other of the electrode chambers from the other of the water discharge pipelines while electrolyzing water passing through the electrolysis vessel by operating the electrode chamber through which the water is caused to flow backwardly as the anode chamber.

2. A method of cleaning an apparatus for continuously forming electrolyzed water as defined in claim 1, wherein a filtration water purifier is interposed in the water supply pipeline or the water supply branch pipe and electrolyzed water formed in the anode chamber of the electrolysis vessel is passed through a water channel in the filtration water purifier entirely or partially.

3. A method of cleaning an apparatus for continuously forming electrolyzed water by electrolyzing water supplied from a water supply pipeline by an electrolysis vessel having or not having a diaphragm, and discharging alkaline water and acidic water formed in the electrolysis vessel from a pair of water discharge pipelines respectively, wherein the method comprises supplying water by backwardly flowing from the pair of water discharge pipelines into the electrolysis vessel, electrolyzing the supplied water with or without changing the polarities of the electrodes of the electrolysis vessel, backwardly flowing electrolyzed water formed in the electrolysis vessel into the water supply pipeline and discharge the same by way of the water discharge channel branched from the water supply pipeline.

4. An apparatus for continuously forming electrolyzed water having an electrolysis vessel partitioned into a cathode chamber and an anode chamber, a water supply pipeline having bifurcate water supply branch pipes in communication with the cathode chamber and the anode chamber, respectively, disposed on one side of the electrolysis vessel, and a pair of water discharge pipeline in communication with the cathode chamber and the anode chamber respectively on the other side of the electrolysis vessel, wherein a channel switching mechanism for cleaning is disposed for switching water passed from the water supply pipeline to the water discharge pipeline on the side of the anode chamber upon cleaning under electrolysis.

5. An apparatus as defined in claim 4, wherein a filtration water purifier is interposed in the water supply pipeline upstream of the water supply branch pipe, the common water discharging portion of the filtration water purifier is in communication with each of the electrode chambers by way of the bifurcate water supply pipelines respectively, and the flow channel switching mechanism for cleaning is disposed between the water supply pipeline upstream of the filtration water purifier and the water discharge pipeline on the side of the anode chamber upon cleaning under electrolysis.

6. An apparatus as defined in claim 4, wherein a filtration water purifier is interposed in the water supply pipeline upstream of the water supply branch pipe, the common water discharge portion of the filtration water purifier is in communication with each of the electrode chambers by way of the bifurcate water supply pipelines respectively, and a first flow channel switching mechanism for cleaning for switching the water passed from the water supply pipeline to the water discharge pipeline on the side of the anode chamber upon cleaning under electrolysis, and a second flow channel switching mechanism for cleaning for connecting the water supply branch pipe on the side of the anode chamber or a sub-pipe branched from the water supply branch pipe on the side of the anode chamber upon cleaning under electrolysis with the water supply pipeline upstream of the filtration water purifier.

7. An apparatus for continuously forming electrolyzed water of electrolyzing water supplied from a water supply pipeline in an electrolysis vessel having or not having a diaphragm, and discharging the resultant alkaline water and acidic water from a pair of water discharge pipeline respectively, wherein the apparatus comprises a flow channel switching mechanism for cleaning for backwardly flowing the water passed from the water supply pipeline into the electrolysis vessel by switching to a pair of water discharge pipelines of the electrolysis vessel, and a branched water discharge pipeline branched by way of a switching valve from the water supply pipeline.

8. An apparatus as defined in claim 7, wherein a filtration water purifier is interposed into the water supply pipeline, and the branched water discharge pipeline is disposed by way of a switching valve to the water supply pipeline upstream of the filtration water purifier.

* * * * *